United States Patent
Pruschek et al.

(10) Patent No.: US 9,836,039 B2
(45) Date of Patent: Dec. 5, 2017

(54) METHOD AND SYSTEM FOR SIMULATING A WORK PROCESS ON A MACHINE TOOL

(75) Inventors: Peter Pruschek, Pfronten (DE); Rudolf Hahn, Schwangau (DE); Bruno Willi, Riefensberg (AT); Michael Tarnofsky, Lengenwang (DE)

(73) Assignee: DMG ELECTRONICS GMBH, Pfronten (DE)

( * ) Notice: Subject to any disclaimer, the term of this patent is extended or adjusted under 35 U.S.C. 154(b) by 701 days.

(21) Appl. No.: 14/124,659

(22) PCT Filed: Jun. 8, 2012

(86) PCT No.: PCT/EP2012/060890
§ 371 (c)(1),
(2), (4) Date: Feb. 19, 2014

(87) PCT Pub. No.: WO2012/168427
PCT Pub. Date: Dec. 13, 2012

(65) Prior Publication Data
US 2014/0200706 A1    Jul. 17, 2014

(30) Foreign Application Priority Data

Jun. 9, 2011 (DE) .................. 10 2011 105 141

(51) Int. Cl.
*G05B 19/18* (2006.01)
*G05B 17/02* (2006.01)
*G05B 19/418* (2006.01)

(52) U.S. Cl.
CPC .......... *G05B 19/182* (2013.01); *G05B 17/02* (2013.01); *G05B 19/41885* (2013.01);
(Continued)

(58) Field of Classification Search
CPC  G05B 19/182; G05B 17/02; G05B 19/41885; G05B 2219/32343; Y02P 90/26; Y02P 90/265
See application file for complete search history.

(56) References Cited

U.S. PATENT DOCUMENTS 5,325,308 A    6/1994  Oyama
6,290,571 B1 *  9/2001  Dilger .............. G05B 19/40937
                                                        451/10
(Continued)

FOREIGN PATENT DOCUMENTS

CN        1427337 A     7/2003
CN      101145047 A     3/2008
(Continued)

OTHER PUBLICATIONS

Office Action dated Apr. 17, 2012, issued in corresponding German Application 10 2011 105 141.8, filed Jun. 9, 2011, 12 pages.
(Continued)

Primary Examiner — Sean Shechtman
Assistant Examiner — Tri T Nguyen
(74) Attorney, Agent, or Firm — Christensen O'Connor Johnson; Matthew Balint

(57) ABSTRACT

A method and system simulates a work process on a machine tool using a virtual machine. The virtual machine is set up to simulate the work process on the machine tool using machine data, workpiece data, and tool data as a function of numerical control (NC) control data and programmable logic control (PLC) control data. The work process is simulated on a platform that comprises a plurality of processor cores, wherein the work process is simulated in partial simulations that run in parallel on different processor cores.

10 Claims, 6 Drawing Sheets

(52) U.S. Cl.
CPC ..... *G05B 2219/32343* (2013.01); *Y02P 90/26* (2015.11); *Y02P 90/265* (2015.11)

(56) References Cited

U.S. PATENT DOCUMENTS

| | | | |
|---|---|---|---|
| 7,174,225 | B2 | 2/2007 | Dolansky |
| 7,684,890 | B2 * | 3/2010 | Grossmann |
| 8,935,138 | B2 * | 1/2015 | Erdim ................ G05B 19/4069 703/7 |
| 2008/0091394 | A1 * | 4/2008 | Hahn ................. G05B 19/4069 703/7 |
| 2011/0035044 | A1 * | 2/2011 | Takahashi .......... G05B 19/4069 700/178 |
| 2012/0029893 | A1 * | 2/2012 | Komatsu ................ G05B 17/02 703/8 |

FOREIGN PATENT DOCUMENTS

| | | |
|---|---|---|
| CN | 101307375 A | 11/2008 |
| CN | 101592920 A | 12/2009 |
| CN | 101713981 A | 5/2010 |
| DE | 103 52 815 A1 | 6/2005 |
| DE | 10 2006 052 757 A1 | 5/2008 |
| EP | 1 762 919 A2 | 3/2007 |
| JP | 5-31647 A | 2/1993 |
| JP | 2008-071350 A | 3/2008 |
| WO | 2009/076987 A1 | 6/2009 |
| WO | WO 2009076987 A1 * | 6/2009 ......... G05B 19/4069 |

OTHER PUBLICATIONS

English Summary (of relevant parts) of First Japanese Office Action, dated Oct. 7, 2014, issued in Japanese Application No. JP 2014-514088, filed Jun. 12, 2013, 1 page.
International Preliminary Report on Patentability dated Dec. 27, 2013, in International Application No. PCT/EP2012/060890, filed Jun. 8, 2012, 7 pages.
International Search Report dated Oct. 26, 2012, in International Application No. PCT/EP2012/060890, filed Jun. 8, 2012, 2 pages.
Office Action dated Aug. 5, 2015, in related Chinese Application No. 201280026207.5, filed Jun. 8, 2012, 7 pages.

* cited by examiner

METHOD AND SYSTEM FOR SIMULATING A WORK PROCESS ON A MACHINE TOOL

FIELD

The present disclosure relates to a method and a system for simulating a work process on a machine tool using a virtual machine.

BACKGROUND

Leading machine tool manufacturers and research institutions have been working on the subject of "virtual machine tools" for a number of years. A key aspect of such virtual machines is associated with the manufacturing process, where interaction between the tool and workpiece is simulated and visualized graphically in 3D. Modern systems reproduce all the moving machine kinematics including material removal during the manufacturing process on the workpiece as a result of machining using the tool.

For example, in EP 1 901 149 B1 the applicant describes a device and a method for simulating a sequence for machining a workpiece in a machine tool, which is designed to reproduce as comprehensively as possible not only all machining operations on the workpiece itself, but also to simulate and reproduce the peripherals of the machine tool including the tool changer, workpiece changer, workspace, etc., in as realistic a holistic depiction as possible.

In machine tool applications, virtual machines usually consist of components on the control side and components on the system side, where the control-side components include the human machine interface (HMI) in the form of the control desk and monitor, the numerical control core, i.e., the control instructions which are predefined by a numerical control (NC) program, and the programmable logic controller (PLC), i.e., the machine-specific controller that usually controls mechanically regulated circuits including additional attachments such as tool changers, supply of cooling water, etc., and corresponding drive controllers, while system-side components specifically include drive systems including their kinematic and kinetic behavior (resilience, thermal behavior) and associated control assemblies, pneumatic/fluid systems, work and spindle kinematics including their geometric representation, work fixtures and tools, workpieces, and material-removal processes carried out herewith.

In many virtual machines, only parts of these components are materialized; additional components are shown in a few cases, such as the geometric representation of an external automation unit.

An important aim of the simulation process to date has been to run through the machining/movement sequences of a real process on the simulation platform in real time in the same steps as in the real application. This made it possible to obtain valuable information concerning the machining sequence, which could actually be expected, e.g., when commissioning a new machine tool or when setting up the machine tool. During this operation, the simulation processing speed may be slowed down to permit more accurate observation or even sped up depending on the performance of the simulation platform.

The simulation speed and thus the ability to obtain a rapid impression of a specific work process beforehand, e.g., regarding the absence of collisions, is currently substantially limited in existing simulation platforms by the capacity of the hardware used, acceleration only being achievable by increasing the clock frequency and integration of new hardware functions still only being achievable to a limited extent in the meantime. On the other hand, machining and movement operations are becoming increasingly complex with advanced machine tool developments, which thus imposes limits on a holistic approach to a virtual machine.

Realization of this fundamental problem is the starting point for the present disclosure, the object of which is to provide a method and a system for simulating a work process in a machine tool using a virtual machine that permits a higher simulation speed.

SUMMARY

The present disclosure describes a method for simulating a work process on a machine tool using a virtual machine that is set up to simulate the process for machining a workpiece on the machine tool using machine data, workpiece data, and tool data as a function of NC control data and PLC control data. According to the present disclosure, the work process is simulated on a platform that comprises a plurality of processor cores, the work process being simulated in partial simulations that run in parallel on different processor cores.

In so doing, the present disclosure ensures a simulation environment that performs better overall in the form of a platform with which the virtual machine can be started several times in parallel.

This includes being able to install the complete virtual machine on a plurality of different processor cores, which then perform the partial simulations. However, it is also possible for only specific virtual machines with correspondingly reduced functionality to be installed and started on different processor cores.

The time advantage offered by parallelization works out as follows: $Tpar=Tseq/N+Tseq/N$, where N=number of NC program sections, C=number of CPU cores or VMs, Tseq=time for sequential processing and Tpar=time for parallel processing, on the assumption that N=C. By way of example, a processing time of $Tpar=2/8 \cdot Tseq=0.25 \cdot Tseq$ plus overheads is obtained in the case of parallelization on 8 VMs.

However, the approach according to the present disclosure not only makes it possible to increase the simulation speed for a given work process with a specific degree of complexity, but also establishes a crucial prerequisite for further development of a holistic simulation of all work processes. In this case, it is crucial that the simulation is not subject to any further restrictions with respect to complexity as a result of the solution according to the present disclosure that in principle offers a different route to that of increasing the computing power, inasmuch as, according to the present disclosure, the work process or simulation of the work process is broken down into partial simulations that run on different processor cores.

In this case, a preferred embodiment of the present disclosure may use what is known as multi-core technology that utilizes a multi-core processor in which several complete processor cores are incorporated in a single chip.

However, the present disclosure is not restricted to the above and a plurality of processor cores may also be used, these being connected to each other by means of a network, either a local network or via the Internet. This makes it possible to perform the partial calculations at different points at which the data required for the section calculated in each case is available, so corresponding technologies such as grid computing or cloud computing can be used.

A further significant advantage of the present disclosure, which is not related directly to increasing the simulation speed, also lies in the fact that consideration is given to the problem of the simulation speed being fundamentally dependent on the hardware selected by the user. Due to the complexity of the virtual machine in this case, it is not only difficult to estimate the achievable performance in advance, but the installation effort and the effort required to adapt to a specific configuration (e.g., graphics card used, operating system) are generally very high. The approach according to the present disclosure plays a significant role in reducing the installation and adaptation effort in this situation as the computer load can also be provided in a local or remote network and/or can be installed on several computers. In this case, it is also possible to merely provide the human machine interface (HMI) on the user's computer. As a result of these measures, the major part of the installation and execution of the overall simulation are not performed on the user's computer system, thus reducing the dependencies of the system components on the local computer and making the installation considerably easier to handle even in the event of updates.

In a preferred embodiment of the method according to the present disclosure, a tool/workpiece machining operation in the work process on the machine tool is subdivided into different machining sections. This may entail sequential machining sections for a workpiece from the unmachined part via different semi-finished stages through to the finished part.

Additionally, or alternatively, the workpiece may be subdivided into different partial volumes. Partial simulations are then performed for the respective machining sections, and these may in turn relate to partial volumes and/or to individual sequential machining sections.

This subdivision into machining sections may, for example, take place as early as in the CAD/CAM system, by the state of the workpiece being established in the CAM system for the start of each section, in geometric form, for example, this state then being stored in a 3D model file (e.g., VRL, IGES, STEP, etc.).

The CAM system post-processor may then, for example, be set up to save entry marks in the NC control instructions, i.e., directly in the NC program, in machining sections selected in advance or in each machining section. These may advantageously be cycle or text marks.

This embodiment also incorporates steps such as transfer of the machining sections using the corresponding entry marks to different processor cores, transfer of the current workpiece geometries corresponding to the respective machining sections of the NC control instructions to the different processor cores and execution of partial simulations by the different processor cores. In other words, the available virtual machines are in each case tasked with simulating a machining section, for which purpose the respective sections of the NC program and the associated current geometry of the semi-finished part are made available to the processor core.

This embodiment has the advantage that, even in those parts of the process chain that are pre-stored in the virtual machine or in the CAD/CAM system, the user can specify machining sections that then make it possible to allow the virtual machine to operate in parallel on different processor cores by means of the method according to the present disclosure.

The concept according to the present disclosure of performing partial simulations of correspondingly previously defined machining sections is a simple way of adding to the procedure to perform a collision detection. According to the present disclosure, for example, the workpiece can be subdivided into different partial volumes for this purpose and individual virtual partial simulations are then performed for said partial volumes. Volume intersections can then be formed between these partial volumes, and a collision detection operation subsequently performed in the next simulation run for two linked volumes, for example. In the next step, an additional volume can then be added to the volume intersection and the collision detection can be performed again, etc., until the final machined workpiece is reached.

In addition, intermediate results for a relevant workpiece can even be produced as part of the CAM analysis and then processed on different virtual machines in the context of corresponding partial simulations with collision detection. The present disclosure also comprises CAM software modified for this purpose which has a corresponding functionality.

It is also possible to divide the work process on the machine tool according to functional sequences for different system components and accordingly to perform partial simulations of functional sequences for the different system components.

According to the present disclosure, it is possible in this case to divide the work process efficiently and directly with the aid of the virtual machine tool by temporarily switching off system components and partial simulations.

An embodiment that follows this approach includes the steps of deactivating all functional sequences with the exception of the system component to simulate the tool paths and the system component to simulate the material-removal model. In this operation, only data relating to the geometry of the unmachined part and the corresponding NC control instructions are made available to the virtual machine in the first instance.

After this, partial simulations of the system components to simulate the material-removal model and the system components to simulate the tool paths are initially performed on a first processor core as a function of predefined NC control instructions and predefined geometries for the unmachined workpiece.

These partial simulations are continued, the workpiece geometry achieved in the material-removal model and the associated status of the NC control instructions being stored at a predefined time $t1$, and a further complete simulation of the first machining section already performed on the first processor core from time interval $t0$ to $t1$ being started on a second processor core, incorporating all system components from the specified virtual machine.

This procedure can be continued accordingly by starting a complete simulation incorporating all system components of the virtual machine on a third processor core or further processor cores for a second, third to xth machining section whenever a further time $t2$ or further times ($t3$ to $tx$) are reached.

In this case, times $t1$ to $tx$ can advantageously be selected such that they correlate to a tool change.

It is also advantageous to divide automatically into machining sections, the NC control instructions being divided according to the available number of virtual machines N on different processor cores and into N−1 machining sections, where one processor core performs a partial simulation of a specific time interval in each case.

The present disclosure also provides a system for simulating a work process on a machine tool with a virtual machine that is set up to simulate the work process on the machine tool using machine data, workpiece data, and tool data as a function of NC control data and PLC control data, the system according to the present disclosure being designed as a platform for simulating the work process, which comprises a plurality of processor cores, said processor cores being set up to perform partial simulations of the work process.

In an advantageous embodiment, the system comprises a multi-core processor in which a plurality of complete processor cores are integrated in a single chip.

The platform for the system according to the invention may also comprise a plurality of processor cores that are connected to each other via a network.

In a preferred embodiment, the system according to the present disclosure may comprise a device for subdividing a machining operation of the work process on the machine tool into different sequential machining sections for a workpiece. In this case, this may be a device for subdividing the machining sections into different stages from the unmachined part via different semi-finished part stages up to the finished part. However, the device may also be designed to subdivide the workpiece into different partial volumes.

In addition, the system may comprise a device for establishing the geometry of the workpiece for the start of each machining section of a predefined NC program and for storing a corresponding workpiece geometry in a 3D model, and a device for saving entry marks at the start of preselected machining sections in preselected NC instructions (i.e., the NC program) for machining the workpiece as part of the machining operation.

The system according to the present disclosure may also comprise a device for subdividing the work process on the machine tool according to functional sequences for different system components and performing partial simulations of functional sequences for the different system components.

Non-exhaustive examples of corresponding system components may include a system component for simulating a tool path, a system component for simulating a material-removal model, a system component for simulating an enclosure model, a system component for simulating a workspace model, a system component for simulating a drive system, a system component for simulating pneumatic/fluid systems, a system component for simulating work fixtures, and a system component for simulating tools and/or workpieces, etc.

In this embodiment, the system may also comprise a device for deactivating all functional sequences with the exception of the system component for simulating the tool paths and/or the system component for simulating the material-removal model.

The system according to the present disclosure may also include a device for enabling remote access to a system according to the present disclosure that, for example, enables a user to configure, start and/or stop a virtual machine without the simulation environment being permanently installed on the user's side. This embodiment also has the advantage of providing an easily maintained simulation environment that is solely in the machine manufacturer's access area, for example.

DESCRIPTION OF THE DRAWINGS

Further advantages and particular embodiments of the present invention are described below with the aid of the figures in which.

DETAILED DESCRIPTION

Figure 1:
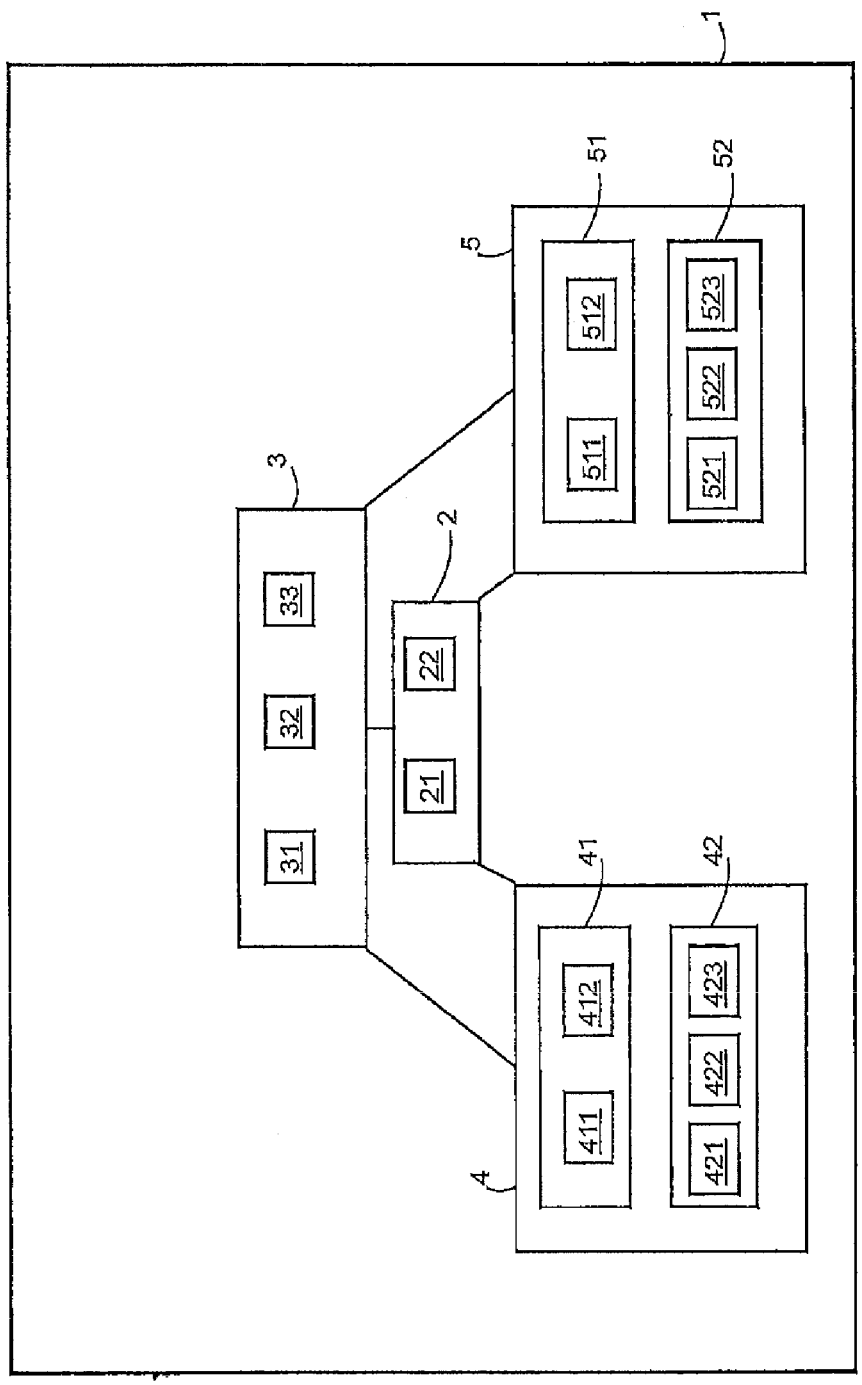
FIG. 1 shows a first embodiment of a system according to the present disclosure for simulating a work process on a machine tool based on a multi-core PC.

A first embodiment of a system according to the present disclosure for simulating a work process on a machine tool using a virtual machine is described with reference to FIG. 1.

In this embodiment, the system according to the present disclosure is realized on a multi-core PC having a plurality of independent processors.

The multi-core PC 1 comprises a human machine interface 2 having a control desk 21 for the user to input commands and a display device 22 to show a three-dimensional simulation of a work process on the machine tool by the virtual machine.

The system also comprises a memory device 3 having a storage element 31 for storing work machine data, a storage element 32 for storing tool data, and a storage element 33 for storing workpiece data, i.e., the unmachined model prior to machining. The reference numeral 4 refers to a first processor on which are installed a control device 41 comprising an NC control program 411 for describing the paths for removal of the material as part of cutting/machining the unmachined component until the geometry of the finished component is obtained, and a PLC controller 412 for machine-specific commands. A first virtual machine 42 is also installed on the first processor 4, said machine comprising a kinematic model 421, a material-removal model 422, and an enclosure model 423.

The embodiment illustrated in FIG. 1 is a dual-core PC, which comprises a second processor 5, with a control device 51, which in turn comprises an NC program 511 and a PLC machine controller 512. In the present embodiment shown in FIG. 1, the controllers 41 and 51 are identical with regard to functionality and are only shown in duplicate in the figure in order to illustrate that they are both installed on processors 4 or 5, respectively.

A virtual machine 52 installed on the second processor core 5 also comprises a kinematic model 521 and a material-removal model 522, which correspond to the kinematic model 421 and the material-removal model 422, as the same NC program, the same unmachined part geometry and the same machine configuration were used, as this is the same machining operation. However, the second virtual machine 52 comprises a workspace model 523 instead of the enclosure model 423, which allows the workspace to be simulated, including work fixtures, table, and booth.

Figure 2:
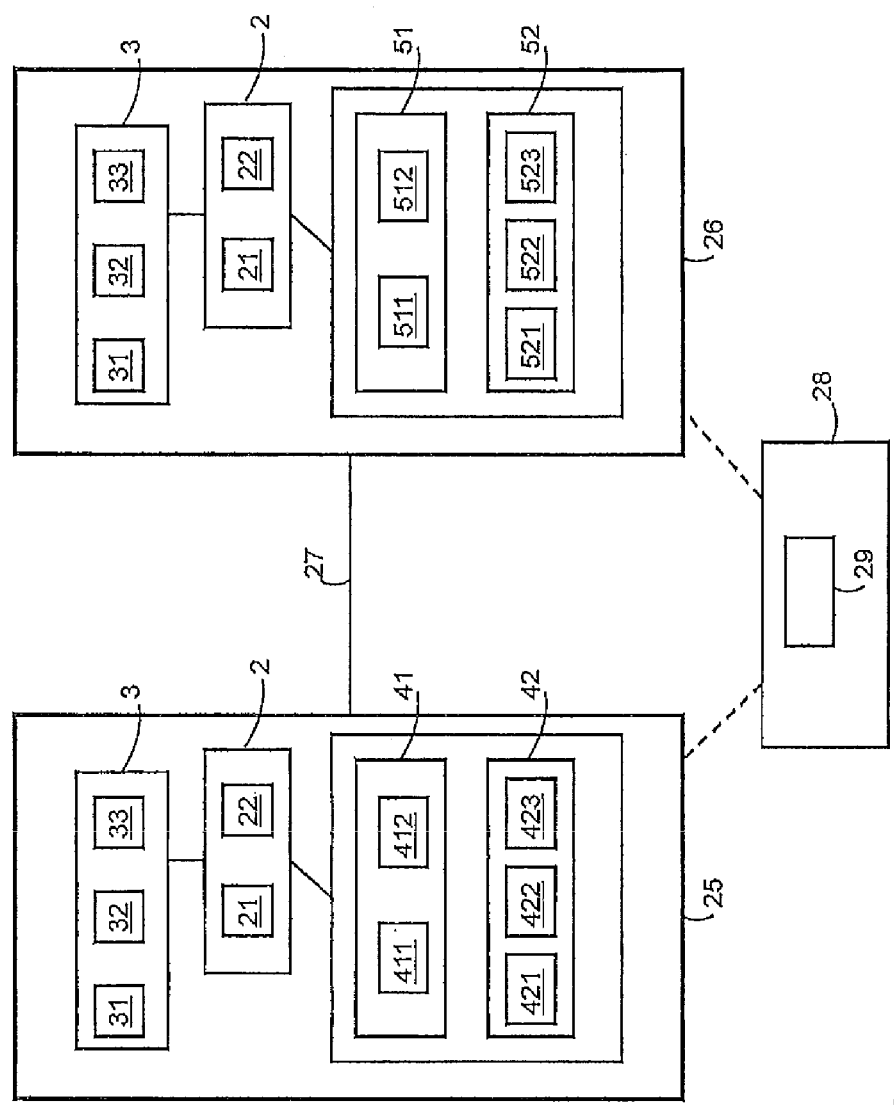
FIG. 2 shows a first embodiment of a system according to the present disclosure for simulating a work process on a machine tool based on individual installations that are linked via a network.

FIG. 2 shows a further embodiment of a system according to the present disclosure for simulating a work process on a machine tool using a plurality of virtual machines that are connected to each other by a network in this embodiment. The embodiment comprises systems 25 and 26 which are connected to each other via a network 27. In this case, the configuration of the two systems 25 and 26 corresponds to the configuration illustrated in FIG. 1, identical reference numerals referring to identical components.

The network 27 in this embodiment is the Internet, with the result that a physical distance is also possible between the two systems 25 and 26 in the implementation of the system and method according to the present disclosure.

In addition, the embodiment in FIG. 2 shows an installation 28 on the user's side with a remote desktop 29 that makes it possible to access the two systems 25 and 26 by remote access. A user can configure, stop, and start simulation sequences via the remote desktop 29, but the simulation environment installation remains under the control of the machine tool manufacturer, which makes it significantly more simple to connect to the hardware and incorporate upgrades as part of the maintenance process. Access to the simulation environment via the remote desktop 29 is of course not restricted to the embodiment shown in FIG. 2, but is merely illustrated by way of example in this case. Remote access of this kind can also be achieved in the embodiment shown in FIG. 1 or other embodiments.

Figure 3:
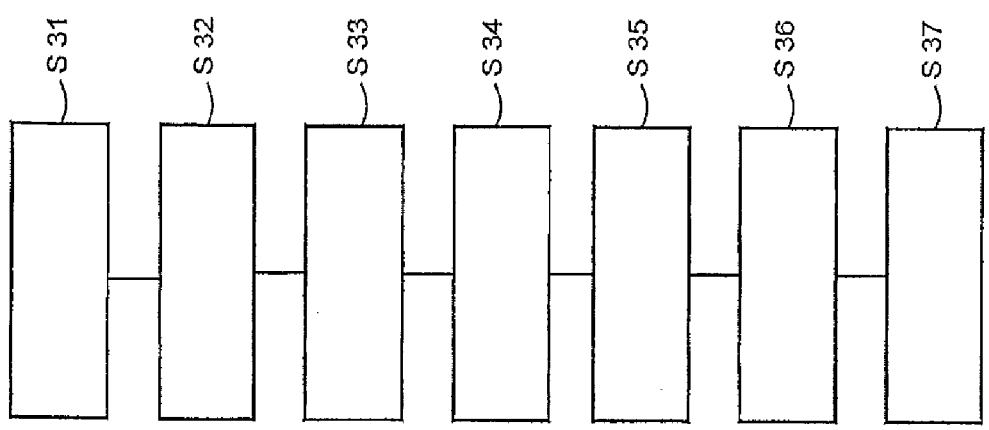
FIG. 3 shows a first embodiment of the method according to the present disclosure for simulating a work process on a machine tool using a virtual machine.

FIG. 3 shows a first embodiment of the method according to the present disclosure for simulating a work process on a machine tool using a multiple installation of a virtual machine.

The state of the workpiece is first established in step S31 in a CAM system for the start of each machining section and this is then stored in a 3D model file in step S32 (for example, in VRML, IGES, STEP format).

The start of each machining section is identified by the post-processor of the CAM system in step S33 by saving an entry mark in the NC program. Corresponding text marks are inserted in this process in the present embodiment.

In step S34, correspondingly identified machining sections are transferred to different processor cores, as illustrated in FIG. 1 or FIG. 2, for example, using the corresponding saved entry mark. The current intermediate part geometries of the workpiece are transferred to the processor cores in step S35 in accordance with the respective machining section of the NC program, and partial simulations are performed on different processor cores by the virtual machines, which are installed on different processor cores in steps S36 or S37, by referring back to the transferred NC machining sections and the respective current geometry of the semi-finished part.

The embodiment of the method according to the present disclosure illustrated in FIG. 3 thus represents an example of subdividing the machining operation of the work process and the machine tool into different sequential machining sections for a workpiece from the unmachined part via different semi-finished part stages up to the machined part, the consecutive machining sections then being simulated on different processor cores at the same time in order to increase the simulation speed in this manner.

Figure 4:
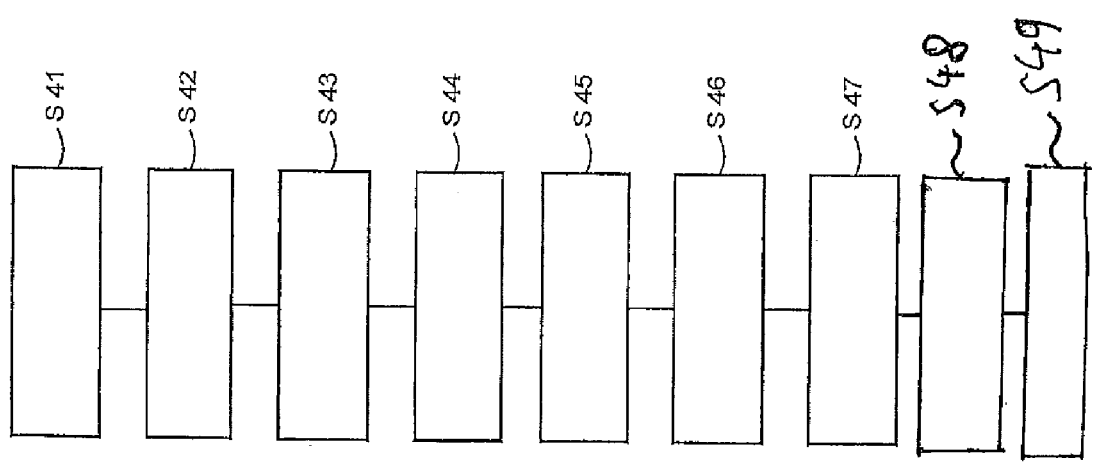
FIG. 4 shows a further embodiment of the method according to the present disclosure for simulating a work process on a machine tool using a virtual machine.

In contrast, FIG. 4 shows a further embodiment of a method according to the present disclosure for simulating a work process on a machine tool using a virtual machine, in which the work process on the machine tool is subdivided according to functional sequences for different system components and partial simulations of functional sequences for different system components are then performed.

The unmachined part geometry and the NC program are made available to the virtual machine in step S41. All functional sequences with the exception of the system component for simulating the tool path and the system component for simulating the material-removal model are deactivated in step S42, i.e., system components 423 and 523 are deactivated in the virtual machines illustrated in FIG. 1, for example.

A partial simulation is now started on a first processor core in step S43, with the aim of simulating the tool paths, and a simulation of the material-removal model is started in step S44 as a function of the predefined NC program and the predefined geometry of the unmachined part of the workpiece.

These simulations are continued in step S45 up to a predefined time t1, which is specified by the user, and in step S46 the geometry of the workpiece in the material-removal model reached at predefined time t1 is stored along with the associated status of the NC program, in this case with the corresponding line number of the NC program, with the partial simulations started in steps S43 and S44 continuing to run.

In step S47, a second virtual machine is then started that calculates a simulation with full complexity, i.e., with all the system components associated with the virtual machine, for the first machining section from t0 to t1. In the embodiment illustrated in FIG. 1, these may, for example, include the additional system component 423 for simulating the machine cabinet or the component 523 for simulating the workspace, although the present disclosure is of course not restricted to these additional system components, but may also, as a general rule, include all system components that form part of the corresponding virtual machines.

In step S48, a third virtual machine is started when a further time t2 is reached, said machine performing the complete calculation of the second machining section from t1 to t2.

In step S49, a fourth virtual machine is started when a further time t3 is reached, said machine performing the complete calculation of a third machining section from t2 to t3.

In the embodiment illustrated in FIG. 4, times t1 to t3 each coincide with a tool change, thus making it easier to start simulating the relevant machining section. According to the present disclosure, the user is able to define the entry points himself in accordance with the specific application. A first run can, for example, be automated by dividing the NC program into N−1 sections according to the available virtual machines N, as a virtual machine is required for the pre-calculating reduced simulation.

Figure 5:
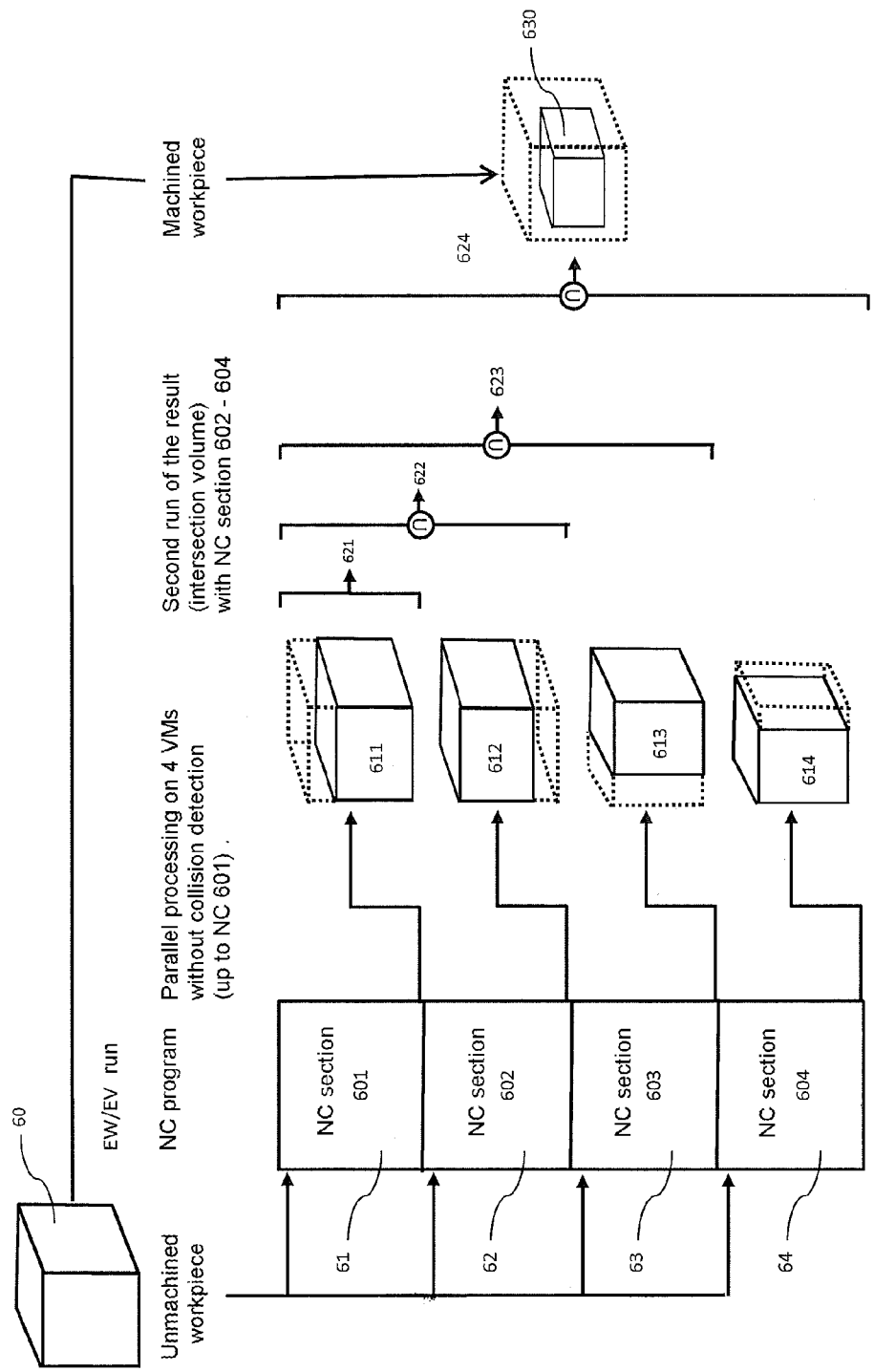
FIG. 5 shows an embodiment of the method according to the present disclosure for simulating a work process on a machine tool using four virtual machines and a plurality of run procedures for collision detection purposes.
Figure 6:
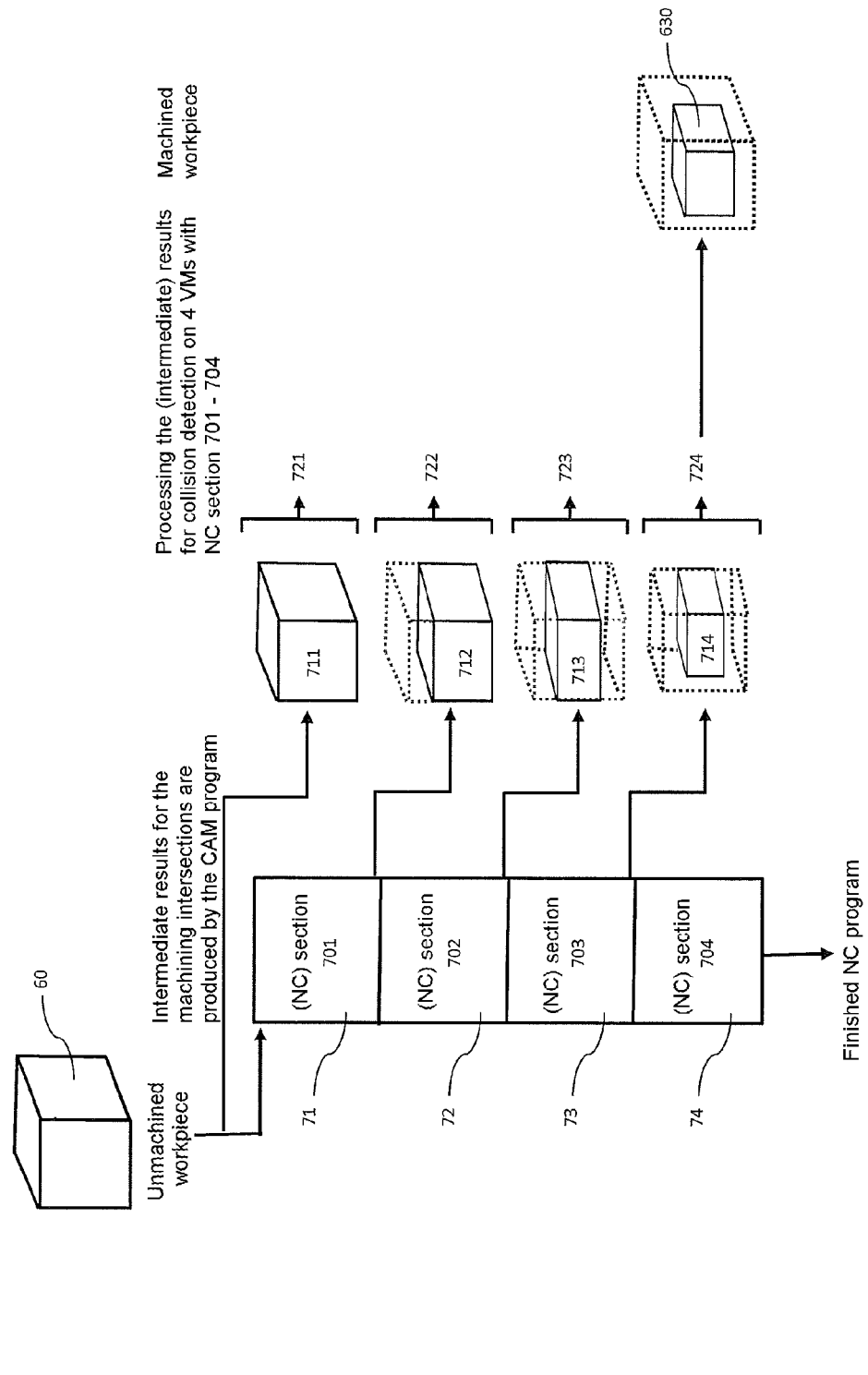
FIG. 6 shows a further embodiment of the method according to the present disclosure for simulating a work process on a machine tool using four virtual machines, the intermediate results of the machining sections being produced in the CAM program.

The embodiments in FIGS. 5 and 6 illustrate two basic options for integrating collision detection as part of the present disclosure concept for the parallel virtual machine when carrying out partial simulations on different processor cores.

FIG. 5 shows an embodiment for machining a workpiece 60 by means of four different virtual machines 61-64, which each operate on different processor cores (not illustrated) using corresponding NC sections 601-604. The illustration shows that corresponding partial volumes 611-614 are processed by the respective NC sections 601-604. In this embodiment, collision detection is carried out merely by the virtual machine 61 in the first run.

In the second run 621-624, corresponding volume intersections are formed from volumes 611-614, and a second run is performed in the respective virtual machine 62, 63, 64 (until virtual machine 61) while performing a collision detection 621-624. The finished workpiece 630 machined in the simulation can then be compared with the CAD template.

The advantage of this embodiment is that, for example, a user can first transfer a complete NC program and corresponding workpiece information to, for example, a management server with virtual machines, in a virtual machine cloud, for example (e.g., via the Internet), and this management server then transfers the workpiece and a respective NC section to corresponding virtual machines 61-64 in order to guarantee appropriate load balancing with regard to computing power in this manner. After running the simulation, the corresponding virtual machines 61-64 report back to the management server in the last step with the machined workpiece 630 including any collisions or defects. One advantage of this embodiment is that no specially developed CAD/CAM software needs to be used in the virtual machine sequence, which means that no modifications in this respect are required on the user's side.

The embodiment in FIG. 6 shows one such example using modified CAD/CAM software. In this embodiment, the intermediate results for the machining sections are produced directly by the CAM program and the (intermediate) results are processed for collision detection purposes on four virtual machines 71-74 using NC sections 701-704 in steps 721-724, resulting in the finished workpiece 630.

In relation to the computer architecture for implementing this parallelization of the virtual machine in this embodiment, the intermediate results for the workpiece are first produced in the CAM program and these can then be sent along with the original workpiece 60 to a management server, for example, which divides the workpiece or the intermediate results and associated NC sections 701-704 between corresponding virtual machines 71-74. These virtual machines 71-74 then process the relevant workpiece volumes with collision detection and pass the results back to the management server, for example, thus resulting in a finished workpiece 630, which can in turn be compared with the CAD template.

The present disclosure is not restricted to the embodiments illustrated above; indeed the described features can be combined to form additional embodiments in order to create an optimized embodiment for a specific application based on the knowledge of persons skilled in the art.

The invention claimed is:

1. A method for simulating a work process on a machine tool using a virtual machine that is set up to simulate a process for machining the workpiece on the machine tool using machine data, workpiece data, and tool data as a function of numerical control (NC) control data and programmable logic controller (PLC) control data, wherein simulation of the work process is performed on a platform that comprises a plurality of processor cores, and wherein the simulation of the work process is performed by generating partial programs which run in parallel on different processor cores, further comprising steps of:

subdividing a machining operation of the work process on the machine tool into different machining sections for a workpiece from an unmachined part, via different semi-finished part stages, to a machined part;
performing partial simulations of the machining sections;
establishing a geometry of the workpiece for the start of each machining section and storing a corresponding workpiece geometry in a 3D model;
saving entry marks at the start of preselected machining sections in preselected NC control instructions for machining the workpiece as part of the machining operation;
transferring a plurality of machining sections to different processor cores using the corresponding entry marks;
transferring current workpiece geometries corresponding to the respective machining section of the NC control instructions to different processor cores; and
performing parallel partial simulation of the transferred machining sections by the different processor cores.

2. A method for simulating a work process on a machine tool using a virtual machine that is set up to simulate a process for machining the workpiece on the machine tool using machine data, workpiece data, and tool data as a function of numerical control (NC) control data and programmable logic controller (PLC) control data, wherein simulation of the work process is performed on a platform that comprises a plurality of processor cores, and wherein the simulation of the work process is performed in partial simulations which run in parallel on different processor cores, the method further comprising steps of:

subdividing the work process on the machine tool according to functional sequences for different system components and carrying out partial simulations of the functional sequences for the different system components;
deactivating all functional sequences with the exception of the system component to simulate tool paths and the system component to simulate a material-removal model;
carrying out partial simulations on a first processor core by starting the system component to simulate tool paths 1; and
starting the system component to simulate the material-removal model as a function of predefined NC control instructions and a predefined unmachined part geometry for the workpiece.

3. The method according to claim 2, continuing the partial simulation to simulate the tool paths and the partial simulation to simulate the material-removal model for a first machining section t0 to t1;
storing the workpiece geometry achieved at a predefined time t1 in the material-removal model and the associated status of the NC control instructions; and
starting a full simulation incorporating all system components of the virtual machine on a second processor core for the first machining section for interval t0 to t1.

4. The method according to claim 3, further comprising a step of:

starting a full simulation incorporating all system components of the virtual machine on a third processor core for a second machining section t1 to t2 and, if applicable, for third to xth machining sections on additional processor cores when a specific time t2 or further specific times t3 to tx is/are reached.

5. The method according to claim 4, wherein times t1 to tx are selected such that they correlate to a tool change.

6. The method according to claim 2, wherein division into machining sections takes place automatically, the control instructions being divided into N−1 machining sections according to the available number of virtual machines N that are installed on different processor cores, where one processor core performs the partial simulations described in claim 2.

7. A system for simulating a work process on a machine tool using a virtual machine that is set up to simulate the work process on the machine tool using machine data, workpiece data, and tool data as a function of numerical control (NC) control data and programmable logic controller (PLC) control data, wherein the system is designed as a platform that comprises a plurality of processor cores, and wherein the processor cores are set up to perform partial simulation programs to simulate the work process, the system comprising:

a device to subdivide a machining operation of the work process on the machine tool into different machining sections for a workpiece;

a device for establishing a geometry of the workpiece for the start of each machining section and storing a corresponding workpiece geometry in a 3D model; and a device for saving entry marks at the start of preselected machining sections in preselected NC control instructions for machining the workpiece as part of the machining operation.

8. A system for simulating a work process on a machine tool using a virtual machine that is set up to simulate the work process on the machine tool using machine data, workpiece data, and tool data as a function of numerical control (NC) control data and programmable logic controller (PLC) control data, wherein the system is designed as a platform that comprises a plurality of processor cores, and wherein the processor cores are set up to perform partial simulation programs to simulate the work process, the system further comprising:

a device for subdividing the work process on the machine tool according to functional sequences for different system components and carrying out partial simulations of the functional sequences for the different system components; and a device for deactivating all functional sequences with the exception of the system component to simulate tool paths and the system component to simulate a material-removal model.

9. A method for simulating a work process on a machine tool using a virtual machine that is set up to simulate a process for machining the workpiece on the machine tool using machine data, workpiece data, and tool data as a function of numerical control (NC) control data and programmable logic controller (PLC) control data, wherein simulation of the work process is performed on a platform that comprises a plurality of processor cores, and wherein the simulation of the work process is performed by generating partial programs which run in parallel on different processor cores, further comprising steps of:

subdividing a machining operation of the work process on the machine tool into different machining sections for partial volumes of a workpiece;

simulating the partial volumes in partial simulations of the machining sections;

establishing a geometry of the workpiece for the start of each machining section and storing a corresponding workpiece geometry in a 3D model;

saving entry marks at the start of preselected machining sections in preselected NC control instructions for machining the workpiece as part of the machining operation;

transferring a plurality of machining sections to different processor cores using the corresponding entry marks;

transferring current workpiece geometries corresponding to the respective machining section of the NC control instructions to different processor cores; and performing parallel partial simulation of the transferred machining sections by the different processor cores.

10. A system for simulating a work process on a machine tool using a virtual machine that is set up to simulate the work process on the machine tool using machine data, workpiece data, and tool data as a function of numerical control (NC) control data and programmable logic controller (PLC) control data, wherein the system is designed as a platform that comprises a plurality of processor cores, and wherein the processor cores are set up to perform partial simulation programs to simulate the work process, wherein the platform comprises a multi-core processor in which a plurality of complete processor cores are integrated in a single chip, the system further comprising:

a device to subdivide a machining operation of the work process on the machine tool into different machining sections for a workpiece;

a device for establishing a geometry of the workpiece for the start of each machining section and storing a corresponding workpiece geometry in a 3D model; and a device for saving entry marks at the start of preselected machining sections in preselected NC control instructions for machining the workpiece as part of the machining operation.

* * * * *